United States Patent
Maruo et al.

(10) Patent No.: US 12,489,124 B2
(45) Date of Patent: Dec. 2, 2025

(54) FUEL CELL SYSTEM

(71) Applicant: TOYOTA JIDOSHA KABUSHIKI KAISHA, Toyota (JP)

(72) Inventors: Tsuyoshi Maruo, Okazaki (JP); Seiichi Tanaka, Nagoya (JP); Makoto Mori, Susono (JP); Tomotaka Ishikawa, Nagoya (JP); Yoshiaki Naganuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 490 days.

(21) Appl. No.: 18/062,053

(22) Filed: Dec. 6, 2022

(65) Prior Publication Data
US 2023/0261216 A1    Aug. 17, 2023

(30) Foreign Application Priority Data
Feb. 16, 2022    (JP) .................... 2022-022419

(51) Int. Cl.
| H01M 8/04089 | (2016.01) |
| H01M 8/04119 | (2016.01) |
| H01M 8/04291 | (2016.01) |
| H01M 8/04746 | (2016.01) |
| H01M 8/04828 | (2016.01) |
| H01M 8/04858 | (2016.01) |
| H01M 8/2483 | (2016.01) |

(52) U.S. Cl.
CPC ... *H01M 8/04097* (2013.01); *H01M 8/04164* (2013.01); *H01M 8/04179* (2013.01); *H01M 8/04291* (2013.01); *H01M 8/04753* (2013.01); *H01M 8/04761* (2013.01); *H01M 8/04843* (2013.01); *H01M 8/0494* (2013.01); *H01M 8/2483* (2016.02)

(58) Field of Classification Search
None
See application file for complete search history.

(56) References Cited

U.S. PATENT DOCUMENTS

2009/0226783 A1*    9/2009    Hasegawa ......... H01M 8/04291
                                                              429/415

FOREIGN PATENT DOCUMENTS

| JP | 2004-139817 | * | 5/2004 |
| JP | 2008010347 A | | 1/2008 |
| JP | 2008-112647 | * | 5/2008 |
| JP | 2009-152217 A | | 7/2009 |
| JP | 2019139910 A | | 8/2019 |
| WO | 2007/013453 A1 | | 2/2007 |

* cited by examiner

*Primary Examiner* — Jonathan Crepeau
(74) *Attorney, Agent, or Firm* — SoraIP, Inc.

(57) ABSTRACT

A fuel cell system includes a fuel cell including a plurality of stacked cells, a fuel gas supply unit configured to supply fuel gas to a supply port of the fuel cell and return the fuel gas exhausted through an exhaust port of the fuel cell, and a controller configured to control an operation of the fuel gas supply unit. The controller is configured to execute a drain process for draining residual water accumulated in the fuel cell through the exhaust port. In the drain process, a first process in which the fuel gas is supplied to the fuel cell until a pressure in the fuel cell reaches a predetermined threshold pressure and a second process in which the pressure in the fuel cell is reduced after the first process are repeatedly executed.

5 Claims, 5 Drawing Sheets

FUEL CELL SYSTEM

CROSS-REFERENCE TO RELATED APPLICATION

This application claims priority to Japanese Patent Application No. 2022-022419 filed on Feb. 16, 2022, incorporated herein by reference in its entirety.

BACKGROUND

1. Technical Field

A technology disclosed in the specification relates to a fuel cell system.

2. Description of Related Art

Japanese Unexamined Patent Application Publication No. 2008-010347 (JP 2008-010347 A) describes a fuel cell system that removes residual water remaining in a fuel cell. In the fuel cell system, a compressor that supplies air (that is, oxidant gas) to the fuel cell and a gas flow channel through which hydrogen (that is, fuel gas) is supplied to the fuel cell are connected via a first connection valve. When the fuel cell system removes residual water in the gas flow channel, the fuel cell system opens the first connection valve and supplies oxidant gas to the gas flow channel with the use of the compressor. As a result, the pressure in the gas flow channel is increased by the oxidant gas, and the residual water in the gas flow channel is removed.

SUMMARY

In the fuel cell system of JP 2008-010347 A, oxidant gas is used to remove residual water in the gas flow channel to which fuel gas should be supplied during power generation. For this reasons, while residual water is being removed, power generation of the fuel cell is stopped. The specification provides a technology for, even during power generation of a fuel cell, making it possible to remove residual water.

An aspect disclosed in the specification relates to a fuel cell system. The fuel cell system includes a fuel cell including a plurality of stacked cells, a fuel gas supply unit configured to supply fuel gas to a supply port of the fuel cell, and a controller configured to control an operation of the fuel gas supply unit. The fuel gas supply unit has a return path configured to return the fuel gas, exhausted through an exhaust port of the fuel cell, to the supply port, and a gas-liquid separator provided in the return path. The controller is configured to execute a drain process for draining residual water accumulated in the fuel cell through the exhaust port. In the drain process, a first process in which the fuel gas is supplied to the fuel cell until a pressure in the fuel cell reaches a predetermined threshold pressure and a second process in which the pressure in the fuel cell is reduced after the first process are repeatedly executed.

In the fuel cell system, in the first process of the drain process, the fuel gas supply unit supplies the fuel gas to the fuel cell to increase the pressure in the fuel cell until the pressure in the fuel cell reaches the predetermined threshold pressure. Thus, residual water in the fuel cell is drained through the exhaust port together with the fuel gas and is separated from the fuel gas in the gas-liquid separator. As a result, the separated fuel gas returns to the supply port of the fuel cell, and the separated residual water is drained to the outside. When the pressure in the fuel cell reaches the predetermined threshold pressure, the fuel gas is difficult to enter the fuel cell. Therefore, the fuel cell system reduces the pressure in the fuel cell in the second process that is executed after the first process. Thus, the fuel gas supply unit is able to supply a large amount of fuel gas to the fuel cell again. In this way, the fuel cell system disclosed in the specification removes residual water in the fuel cell by using the fuel gas. Therefore, the fuel cell system is able to remove residual water even during power generation of the fuel cell.

In one embodiment of the technology, the fuel gas supply unit may include an exhaust valve connected to the gas-liquid separator. In this case, the controller may be configured to, in the first process, keep the exhaust valve closed and, in the second process, reduce the pressure in the fuel cell by opening the exhaust valve.

In one embodiment of the technology, the controller may be configured to, in the second process, reduce the pressure in the fuel cell by increasing the amount of electric power generated by the fuel cell as compared to the amount of electric power generated in the first process.

In one embodiment of the technology, the fuel cell may further include a manifold communicating the exhaust port with the plurality of cells, and a bypass tube extending from the manifold to the exhaust port.

In one embodiment of the technology, the controller may be configured to, in the first process, change the flow rate of the fuel gas supplied to the fuel cell in accordance with an inclination of the fuel cell with respect to a horizontal direction.

In one embodiment of the technology, the controller may be configured to execute the drain process when an operation track record of the fuel cell exceeds a predetermined threshold track record.

The details of the technology disclosed in the specification and further improvement will be described in "Detailed Description of Embodiments".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the technology, the fuel gas supply unit may include an exhaust valve connected to the gas-liquid separator. In this case, the controller may be configured to, in the first process, keep the exhaust valve closed and, in the second process, reduce the pressure in the fuel cell by opening the exhaust valve. With such a configuration, it is possible to supply a large amount of fuel gas into the fuel cell by repeating opening and closing the exhaust valve in a short time. As a result, for example, even in a situation in which residual water is difficult to be drained, such as when the fuel cell is disposed so as to be inclined with respect to a horizontal direction, it is possible to drain residual water by using a large amount of fuel gas.

In one embodiment of the technology, the controller may be configured to, in the second process, reduce the pressure in the fuel cell by increasing the amount of electric power generated by the fuel cell as compared to the amount of electric power generated in the first process. With such a configuration, fuel gas for draining residual water is used for power generation, so it is possible to drain residual water without wasting fuel gas.

In one embodiment of the technology, the fuel cell may further include a manifold communicating the exhaust port with the plurality of cells, and a bypass tube extending from the manifold to the exhaust port. With such a configuration, the pressure in the bypass tube tends to be locally negative due to exhaust of fuel gas through the exhaust port. Therefore, it is possible to drain residual water through the exhaust port via the bypass tube.

In one embodiment of the technology, the controller may be configured to, in the first process, change the flow rate of the fuel gas supplied to the fuel cell in accordance with an inclination of the fuel cell with respect to a horizontal direction. When the fuel cell is disposed so as to be inclined with respect to the horizontal direction, residual water cannot be drained from the inside of the fuel cell even when fuel gas is supplied to the fuel cell. With such a configuration, by changing the flow rate of fuel gas in accordance with an inclination, even when the fuel cell is disposed so as to be inclined with respect to the horizontal direction, it is possible to drain residual water from the inside of the fuel cell.

In one embodiment of the technology, the controller may be configured to execute the drain process when an operation track record of the fuel cell exceeds a predetermined threshold track record. In another embodiment, the drain process may be, for example, executed at intervals of a predetermined period.

Embodiment

Figure 1:
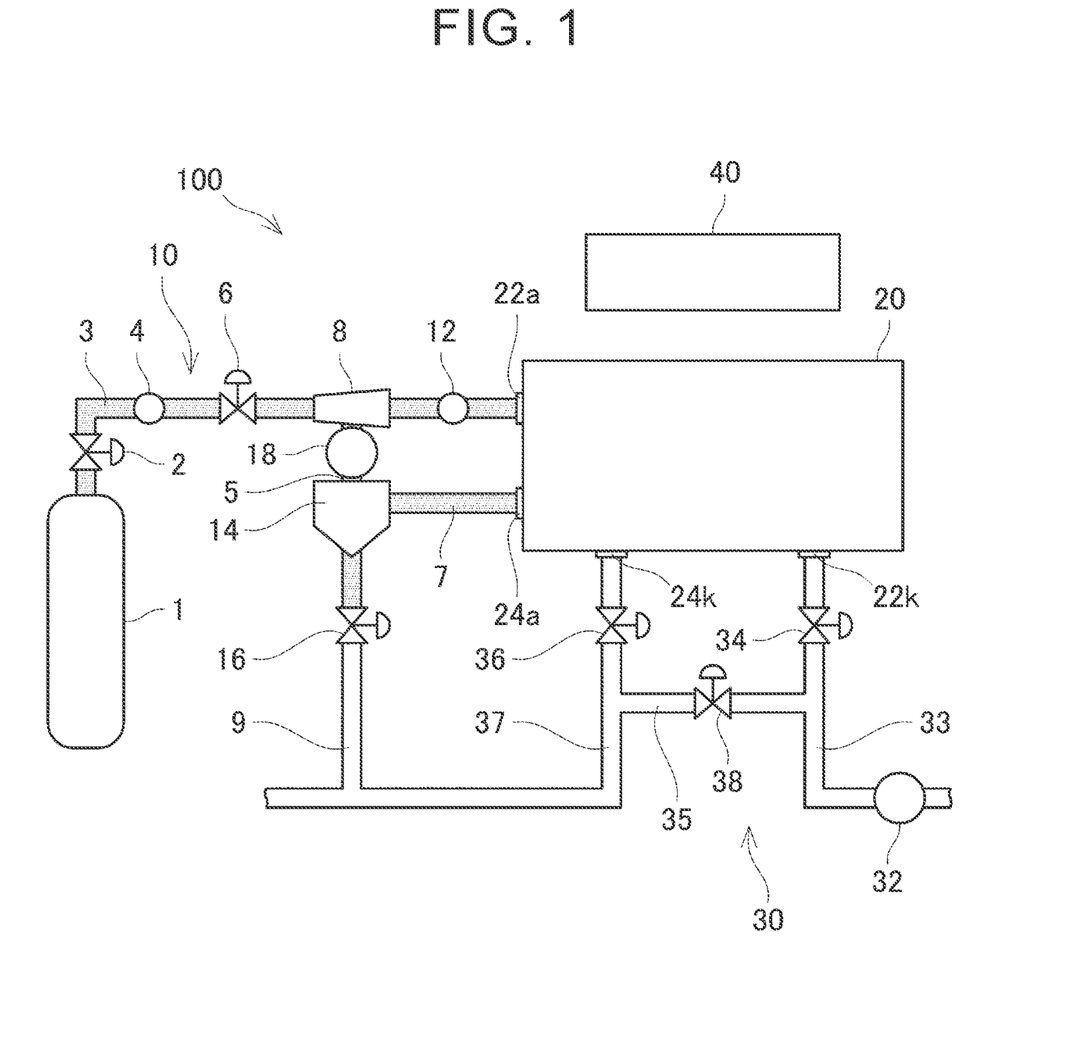
FIG. 1 is a block diagram of a fuel cell system according to a first embodiment.

Hereinafter, a fuel cell system of an embodiment will be described with reference to the accompanying drawings. FIG. 1 is a block diagram of the fuel cell system 100 according to the embodiment. The fuel cell system 100 is mounted on a battery electric vehicle (not shown). The fuel cell system 100 includes a fuel cell 20. The fuel cell system 100 is a system for generating electric power by using the fuel cell 20. The fuel cell system 100 supplies the generated electric power to a drive motor (not shown) of the battery electric vehicle. Alternatively, the fuel cell system 100 charges a battery (not shown) of the battery electric vehicle with the generated electric power.

Figure 2:
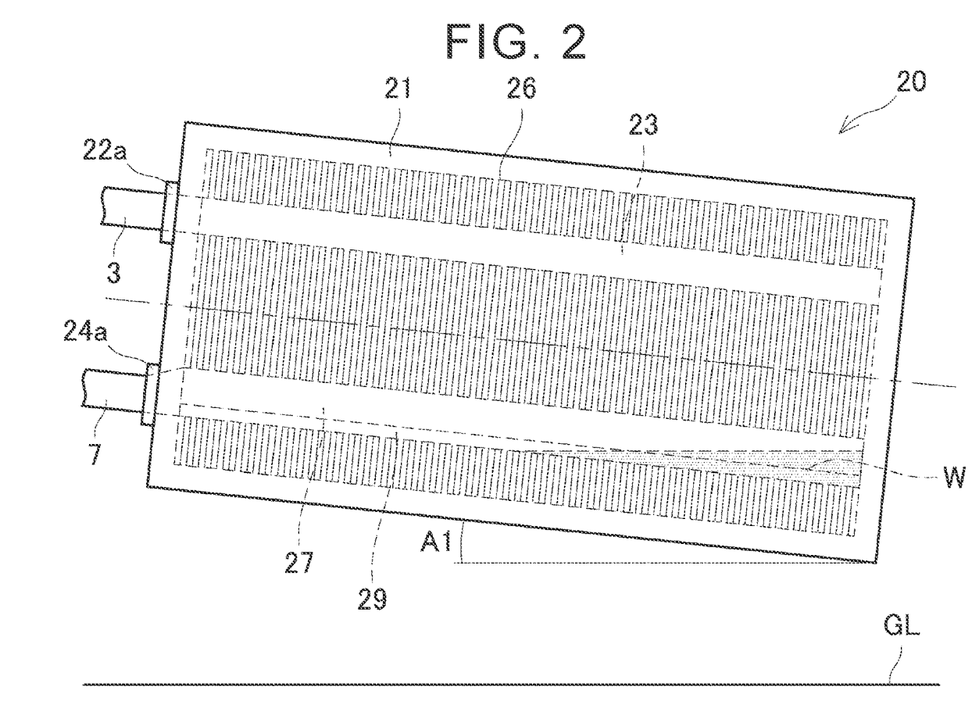
FIG. 2 is a side view of a fuel cell.

The fuel cell 20 includes an anode supply port 22a, a cathode supply port 22k, and a plurality of cells 26 (see FIG. 2). The anode supply port 22a takes in fuel gas (that is, hydrogen gas). The cathode supply port 22k takes in oxidant gas (that is, air). The fuel cell 20 generates electric power by causing a chemical reaction to take place between hydrogen gas taken in through the anode supply port 22a and oxygen in air taken in through the cathode supply port 22k. A chemical reaction that takes place at the time when the fuel cell 20 generates electric power is known, so the detailed description is omitted.

The fuel cell system 100 further includes a fuel gas supply unit 10, an oxidant gas supply unit 30, and a controller 40 in addition to the fuel cell 20. The fuel gas supply unit 10 includes a hydrogen tank 1, a pressure reducing valve 2, a supply tube 3, an intermediate pressure sensor 4, an injector 6, an ejector 8, a return tube (return path) 5, a low pressure sensor 12, an exhaust tube 7, a gas-liquid separator 14, an exhaust and drain valve (exhaust valve) 16, a pump 18, and an exhaust and drain tube 9. The fuel gas supply unit 10 is a unit for supplying the fuel cell 20 with hydrogen gas stored in the hydrogen tank 1. The hydrogen tank 1 is connected to the anode supply port 22a of the fuel cell 20 via the supply tube 3. Thus, hydrogen gas in the hydrogen tank 1 is supplied to the fuel cell 20 via the supply tube 3. In FIG. 1, for the sake of easy understanding, the tubes 3, 5, 7 through which hydrogen gas circulates are indicated by dots.

The intermediate pressure sensor 4, the pressure reducing valve 2, the injector 6, the ejector 8, and the low pressure sensor 12 are connected to the supply tube 3. The pressure reducing valve 2 reduces the pressure of high-pressure hydrogen gas in the hydrogen tank 1 to a predetermined pressure. The intermediate pressure sensor 4 detects the pressure reduced by the pressure reducing valve 2. The injector 6 is an electromagnetic valve that adjusts the amount of hydrogen gas supplied to the ejector 8. As the opening degree of the injector 6 increases, the output power of the injector 6 increases, with the result that the amount of hydrogen gas supplied to the ejector 8 increases. The ejector 8 takes in hydrogen gas from the return tube 5 by using the pressure of hydrogen gas supplied from the injector 6. The low pressure sensor 12 detects the pressure of hydrogen gas supplied from the ejector 8 to the fuel cell 20. In other words, the low pressure sensor 12 detects the pressure in the fuel cell 20.

The exhaust tube 7 of the fuel gas supply unit 10 is connected to an anode exhaust port 24a of the fuel cell 20. Off-gas exhausted through the anode exhaust port 24a flows into the gas-liquid separator 14 via the exhaust tube 7. Here, off-gas contains excess hydrogen gas in the chemical reaction that takes place in the fuel cell 20.

The gas-liquid separator 14 separates off-gas exhausted through the anode exhaust port 24a into hydrogen gas and impurities. For example, the gas-liquid separator 14 separates off-gas in the gas-liquid separator 14 into hydrogen gas, nitrogen gas, water, and the like. Nitrogen gas is, for example, nitrogen contained in air supplied to the cathode supply port 22k, passing through the electrolyte membranes (not shown) of the cells 26 and reaching the anode side. The pump 18 supplies hydrogen gas, separated from off-gas by the gas-liquid separator 14, to the ejector 8 via the return tube 5. Thus, hydrogen gas is supplied to the anode supply port 22a of the fuel cell 20 via the ejector 8 again. In this way, the fuel gas supply unit 10 returns hydrogen gas (that is, fuel gas) contained in off-gas. In a modification, the fuel gas supply unit 10 does not need to include the pump 18. In this case, hydrogen gas in the return tube 5 may be supplied to the ejector 8 by negative pressure generated in the ejector 8.

The gas-liquid separator 14 is connected to the fuel cell 20 via the exhaust tube 7. The exhaust and drain valve 16 is connected to the fuel cell 20 via the gas-liquid separator 14 and the exhaust tube 7. When the exhaust and drain valve 16 is opened, impurities such as nitrogen gas separated from off-gas by the gas-liquid separator 14 are exhausted to the exhaust and drain tube 9.

The oxidant gas supply unit 30 supplies air (oxygen) to the fuel cell 20. The oxidant gas supply unit 30 includes a compressor 32, a supply tube 33, a bypass tube 35, an exhaust tube 37, and valves 34, 36, 38. The compressor 32 compresses outside air and supplies the air to the cathode supply port 22k of the fuel cell 20 via the supply tube 33. The exhaust tube 37 is connected to a cathode exhaust port 24k. The bypass tube 35 connects the supply tube 33 and the exhaust tube 37 via the valve 38. The valve 34 and the valve 36 are so-called pressure regulating valves. The pressure of air supplied to the fuel cell 20 is adjusted by the valves 34, 36.

The controller 40 is a computer that includes a CPU and a memory. The controller 40 controls the units 10, 30 in accordance with travel information such as the accelerator operation amount and speed of a fuel cell electric vehicle. Thus, the fuel cell generates electric power based on travel information.

The details of the structure of the fuel cell 20 will be described with reference to FIG. 2. The fuel cell 20 includes a case 21, a supply manifold 23, an exhaust manifold 27, and a bypass tube 29 in addition to the cells 26. The case 21 has a rectangular shape and accommodates the cells 26. The cells 26 are configured such that the cells 26 are stacked in the longitudinal direction of the case 21. The anode supply port 22a and the anode exhaust port 24a are disposed at one side face of the case 21 in the longitudinal direction. Hereinafter, to help understanding, one side of the fuel cell 20 in the longitudinal direction may be referred to as front side, and the other side may be referred to as back side.

The anode supply port 22a is located above the anode exhaust port 24a. The supply tube 3 is connected to the supply manifold 23 via the anode supply port 22a. The supply manifold 23 is a space that communicates the supply tube 3 with the cells 26. The supply manifold 23 is open to outside the case 21 at the front side of the fuel cell 20 and is closed by the case 21 at the back side of the fuel cell 20. Hydrogen gas in the supply tube 3 is supplied to the cells 26 via the supply manifold 23.

Similarly, the exhaust tube 7 is connected to the exhaust manifold 27 via the anode exhaust port 24a. The exhaust manifold 27 is a space that communicates the exhaust tube 7 with the cells 26. The exhaust manifold 27 is open to outside the case 21 at the front side of the fuel cell 20 and is closed by the case 21 at the back side of the fuel cell 20. Off-gas having passed through the cells 26 is exhausted to the exhaust tube 7 via the anode exhaust port 24a.

The bypass tube 29 has a cylindrical shape, and both ends of the bypass tube 29 are open. The bypass tube 29 is disposed at the bottom of the exhaust manifold 27. The bypass tube 29 extends along the bottom of the exhaust manifold 27 to the anode exhaust port 24a. The back-side end of the bypass tube 29 is located at the back-side end of the exhaust manifold 27. The cross-sectional area of the bypass tube 29 is smaller than the cross-sectional area of the exhaust manifold 27. Therefore, the flow velocity of off-gas that passes through the bypass tube 29 is higher than the flow velocity of off-gas that passes through the exhaust manifold 27. In the bypass tube 29, there are a manifold pressure loss and a dynamic pressure difference, and there arises a pressure difference between the inlet and outlet of the bypass tube 29. Therefore, the bypass tube 29 is able to drain residual water W to outside the fuel cell 20 through the anode exhaust port 24a in a relatively short time.

The exhaust manifold 27 extends in the longitudinal direction along the bottom of the case 21 of the fuel cell 20 from the back side of the fuel cell 20 toward the front side. Therefore, water produced by chemical reaction tends to remain in the exhaust manifold 27. Particularly, when, for example, the fuel cell electric vehicle on which the fuel cell system 100 is mounted is running on an inclined slope and the fuel cell 20 is inclined at an angle of A1 with respect to a ground GL, residual water W tends to accumulate at the back-side end of the exhaust manifold 27 of the fuel cell 20 as shown in FIG. 2. Hereinafter, the drain process that the controller 40 executes to drain residual water W from the inside of the fuel cell 20 will be described.

Figure 3:
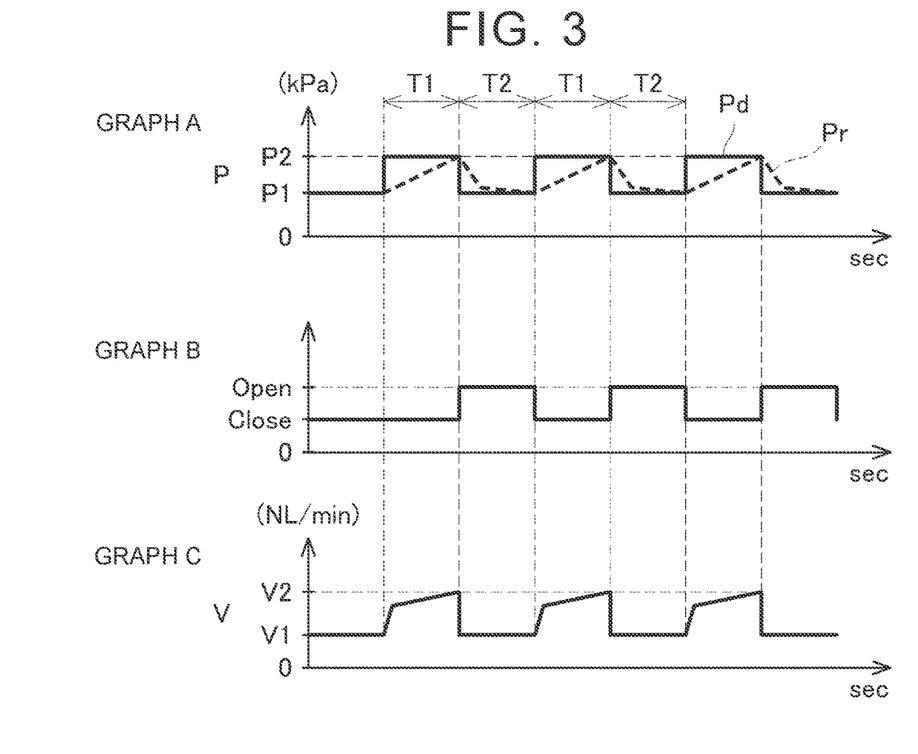
FIG. 3 shows graphs respectively showing changes in values in the case where a drain process is executed by a controller according to the first embodiment.
Figure 4:
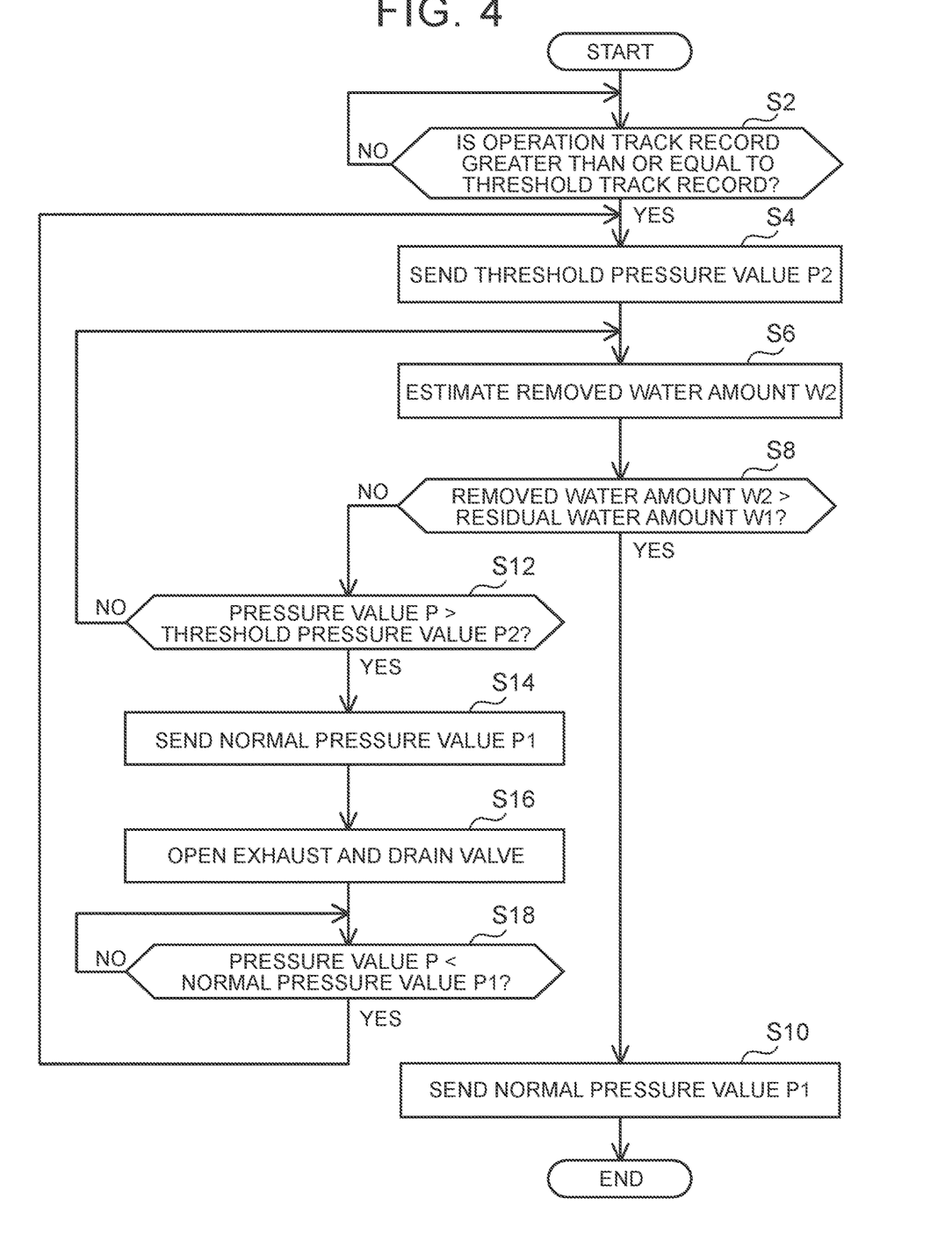
FIG. 4 is a flowchart of a process that is executed by the controller according to the first embodiment.

The drain process that the controller 40 of the first embodiment executes will be described with reference to FIG. 3 and FIG. 4. FIG. 3 shows a change in pressure value P in the fuel cell 20 (graph A), a change in the state of the exhaust and drain valve 16 (graph B), and a change in the flow rate V of hydrogen gas supplied to the fuel cell 20 (graph C) with time. In the graph A, the continuous line represents a pressure command value Pd in the fuel cell 20, which the controller 40 sends to the fuel gas supply unit 10, and the dashed line represents an actually detected value Pr (that is, a pressure value P in the fuel cell 20) of the low pressure sensor 12 (see FIG. 1).

The controller 40 executes a first process over a first period T1 and then executes a second process over a second period T2. As represented by the continuous line of the graph A in FIG. 3, in the first process, the controller 40 sends a threshold pressure value P2 as the pressure command value Pd to the fuel gas supply unit 10 over each of the first periods T1. Specifically, in the first process, the controller 40 increase the flow rate V of fuel gas supplied to the fuel cell 20 by controlling the pressure reducing valve 2, injector 6, and pump 18 of the fuel gas supply unit 10 until the pressure value P in the fuel cell 20 reaches the threshold pressure value P2. Here, the threshold pressure value P2 is a pressure value for determining that the fuel cell 20 is a state of being able to supply fuel gas and is calculated in accordance with the size of the fuel cell 20, the sizes of the tubes of the fuel gas supply unit 10, and the like. As a result, as shown in the graph C of FIG. 3, in each of the first periods T1, the flow rate V of hydrogen gas supplied into the fuel cell 20 increases from a normal flow rate V1 to a drain flow rate V2.

Therefore, hydrogen gas passes through the manifolds 23, 27 in the fuel cell over each of the first periods T1. During then, residual water W (see FIG. 2) accumulated in the exhaust manifold 27 is drained to the exhaust tube 7 via the anode exhaust port 24a.

As represented by the graph B of FIG. 3, the controller 40 keeps the exhaust and drain valve 16 closed over each of the first periods T1 in the first process. In other words, in each of the first periods T1, fuel gas is supplied to the fuel cell 20 in a state where the supply tube 3, the fuel cell 20, the exhaust tube 7, the return tube 5, and the like are hermetically sealed. Therefore, as represented by the dashed line in the graph A of FIG. 3, an actual pressure value P in the fuel cell 20 increases from a normal pressure value P1 to a threshold pressure value P2 in each of the first periods T1.

The controller 40 starts the second process when the pressure value P in the fuel cell 20 has reached the threshold pressure value P2. In the second process, the controller 40 opens the exhaust and drain valve 16 over each of the second periods T2. In each of the second periods T2, as shown in the graph A of FIG. 3, the controller 40 sends the normal pressure value P1 lower than the threshold pressure value P2 to the fuel gas supply unit 10 as the pressure command value Pd. As a result, in each of the second periods T2, as shown in the graph C of FIG. 3, the flow rate V of fuel gas supplied to the fuel cell decreases from the drain flow rate V2 to the normal flow rate V1. In addition, as represented by the dashed line in the graph A of FIG. 3, in each of the second periods T2, the pressure value P in the fuel cell 20 decreases from the threshold pressure value P2 to the normal pressure value P1.

In this way, in the second process, the pressure value P in the fuel cell 20 decreases to the normal pressure value P1. As a result, the controller 40 is able to supply hydrogen gas into the fuel cell 20 by executing the first process again. In other words, residual water W in the fuel cell 20 is drained again. In this way, the controller 40 is able to drain residual water W accumulated in the exhaust manifold 27 of the fuel cell 20 through the anode exhaust port 24a by alternately repeating the first process and the second process.

Next, the drain process that the controller 40 executes will be described with reference to FIG. 4. The controller 40, for example, executes the process of FIG. 4 while the battery electric vehicle is running. Therefore, at the time when the controller 40 starts the drain process of FIG. 4, the controller 40 sends the normal pressure value P1 to the fuel gas supply unit 10 as the pressure command value Pd, the pressure reducing valve 2 and the injector 6 (see FIG. 1) are open, and hydrogen gas is supplied to the fuel cell 20 at the normal flow rate V1. In other words, at the time when the controller 40 starts the drain process, the fuel cell 20 is generating electric power.

In step S2, the controller 40 determines whether the operation track record of the fuel cell 20 is greater than or equal to a threshold track record. Specifically, the controller 40 determines whether the amount of electric power generated by the fuel cell 20 is a threshold amount of electric power. The amount of residual water W (see FIG. 2) accumulated in the fuel cell 20 is proportional to the amount of electric power generated by the fuel cell 20. Therefore, when the amount of electric power generated by the fuel cell 20 is less than the threshold amount of electric power, it is estimated that the amount of residual water W is small. In this case, the controller 40 determines that the operation track record of the fuel cell 20 has not reached the threshold track record (NO in S2) and executes the process of step S2 again. In other words, the controller 40 repeats the process of step S2 until the amount of electric power generated by the fuel cell 20 becomes greater than or equal to the threshold amount of electric power (that is, until it is estimated that the amount of residual water W exceeds a predetermined amount).

When the generated amount of electric power is greater than or equal to the threshold amount of electric power, the controller 40 determines that the operation track record of the fuel cell 20 is greater than or equal to the threshold track record (YES in S2), proceeds with the process to step S4, and starts the first process. In step S4, as described with reference to the graph A of FIG. 3, the controller 40 sends the threshold pressure value P2 to the fuel gas supply unit 10 as the pressure command value Pd. Thus, the output power of each of the injector 6 and the pump 18 increases. As a result, the flow rate V of hydrogen gas supplied to the fuel cell 20 increases to the drain flow rate V2.

As described above, the controller 40 receives travel information of the battery electric vehicle. Therefore, when, for example, the battery electric vehicle is running on a slope, the controller 40 is able to estimate an angle A1 (see FIG. 2) of the slope with respect to the horizontal direction from information such as the torque and rotation speed of the motor, a travel speed, and the like. In the processes of step S2 and step S4, the controller 40 adjusts the magnitude of the threshold pressure value P2 in accordance with the estimated angle A1. Specifically, as the angle A1 increases, the controller 40 increases the threshold pressure value P2. Thus, as the angle A1 increases, the output power of the injector 6 increases, and a large amount of hydrogen gas is supplied to the fuel cell 20. Therefore, it is possible to drain residual water in the inclined fuel cell 20.

In step S6, the controller 40 calculates a removed water amount W2 from the output power of the injector 6, determined in the process of step S4, and an elapsed time. Subsequently, in step S8, the controller 40 compares the residual water amount W1 calculated from the operation track record of step S2 with the removed water amount W2 calculated in step S6. Here, the residual water amount W1 is the amount of residual water W, estimated to remain in the fuel cell 20 and calculated in accordance with the operation track record. Once the entire residual water W with the residual water amount W1 is removed, it is estimated that drain of water from the fuel cell 20 is complete. Therefore, when the removed water amount W2 is greater than the residual water amount W1 (YES in S8), the controller 40 determines that drain of the residual water W is complete and proceeds with the process to step S10, and sends the normal pressure value P1 to the fuel gas supply unit 10 as the pressure command value Pd. As a result, the output power of the injector 6 reduces. Thus, the flow rate V of hydrogen gas supplied to the fuel cell 20 decreases to the normal flow rate V1. After that, the controller 40 ends the drain process.

On the other hand, when the removed water amount W2 is less than the residual water amount W1 (NO in S8), the controller 40 determines that residual water W is still accumulated in the fuel cell 20, that is, drain of water from the fuel cell 20 is not complete, and, in step S12, compares the pressure value P of the fuel cell 20 with the threshold pressure value P2. When the pressure value P has not reached the threshold pressure value P2 (NO in S12), the controller 40 returns to the process of step S6 again and estimates the removed water amount W2. The controller 40 executes the process of step S8 again and compares the residual water amount W1 with the removed water amount W2. In this case, the residual water amount W1 in the fuel cell 20 is reduced through the process of step S4. The controller 40 repeats the processes of step S6 and step S8 until the residual water amount W1 becomes less than a predetermined threshold water amount or until the pressure value P reaches the threshold pressure value P2. Here, the threshold water amount is the amount of residual water W determined to be not problematic even when residual water W remains in the fuel cell 20. The threshold water amount is calculated in accordance with the size, amount of power generated, and the like of the fuel cell 20.

When the pressure value P has reached the threshold pressure value P2 (YES in S12), the controller 40 proceeds with the process to step S14 and starts the second process. In the process of step S14, as described with reference to the graph A of FIG. 3, the controller 40 sends the normal pressure value P1 to the fuel gas supply unit 10 as the pressure command value Pd. Thus, as has been described with reference to the graph C of FIG. 3, the flow rate V of hydrogen gas supplied to the fuel cell 20 decreases to the normal flow rate V1. In addition, in step S16, as has been described with reference to the graph B of FIG. 3, the controller 40 opens the exhaust and drain valve 16. Thus, the pressure value P in the fuel cell 20 decreases.

Subsequently, in step S18, the controller 40 determines whether the pressure value P has decreased to the normal pressure value P1. When the pressure value P has not decreased to the normal pressure value P1 (NO in S18), the controller 40 returns to the process of step S18 and monitors whether the pressure value P has decreased to the normal pressure value P1. In other words, the controller 40 repeats the process of step S18 until the pressure value P decreases to the normal pressure value P1.

When the pressure value P has decreased to the normal pressure value P1 (YES in S18), the controller 40 executes the process of step S4 again and sends the threshold pressure value P2 to the fuel gas supply unit 10 as the pressure command value Pd. In other words, when the pressure value P has decreased to the normal pressure value P1, the controller 40 executes the first process again.

In this way, when the pressure value P has reached the threshold pressure value P2 in the first process, the controller 40 of the present embodiment reduces the pressure value P in the fuel cell 20 by opening the exhaust and drain valve 16 in the second process. Therefore, it is possible to relatively easily reduce the pressure value P in the fuel cell 20. Thus, it is possible to drain a large amount of accumulated residual water W in a relatively short time.

Second Embodiment

A fuel cell system 100 of a second embodiment will be described with referenced to FIG. 5 and FIG. 6. The fuel cell system 100 of the second embodiment differs from the fuel cell system 100 of the first embodiment in that a different process is executed in the second process, and the fuel cell systems 100 have similar configurations in the other points.

Figure 5:
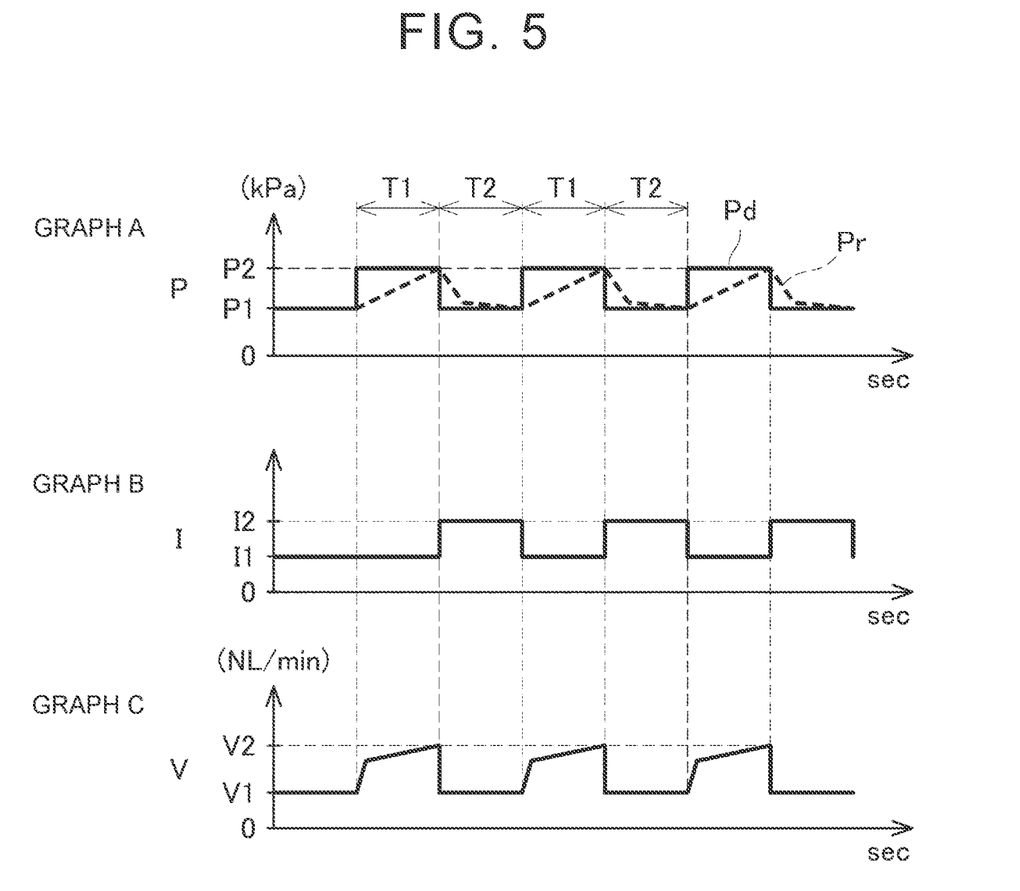
FIG. 5 shows graphs respectively showing changes in values in the case where a drain process is executed by a controller according to a second embodiment.
Figure 6:
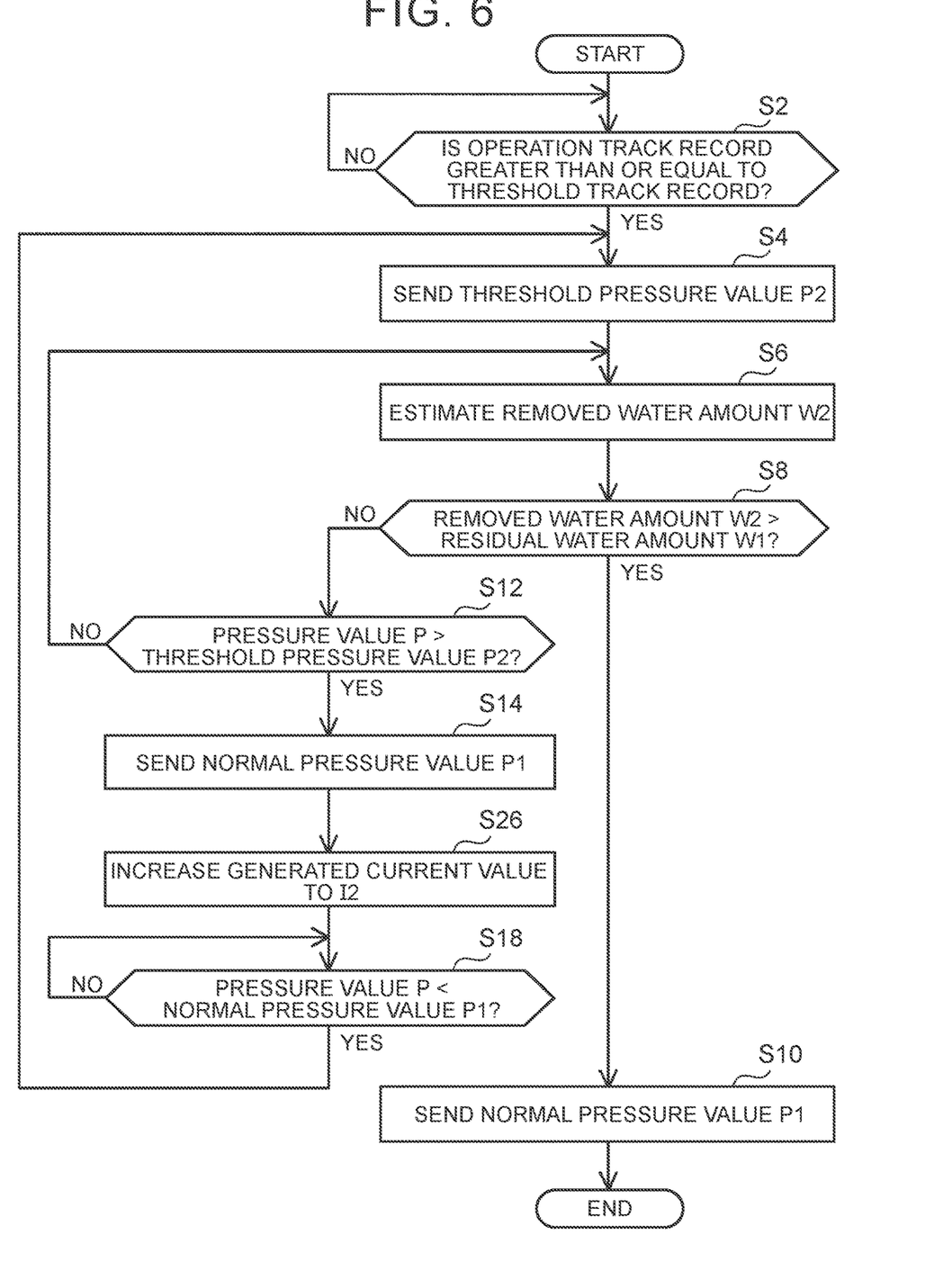
FIG. 6 is a flowchart of a process that is executed by the controller according to the second embodiment.

FIG. 5 shows a change in pressure value P in the fuel cell 20 (graph A), a change in generated current value I of the fuel cell 20 (graph B), and a change in the flow rate V of hydrogen gas supplied to the fuel cell 20 (graph C) with time. The graph A of FIG. 5 is similar to the graph A of FIG. 3. The graph C of FIG. 5 is similar to the graph C of FIG. 3. The controller 40 of the second embodiment, in the second process, increases the generated current value I of the fuel cell 20 from a normal current value I1 to a drain current value I2 over each of the second periods T2. The controller 40 controls the oxidant gas supply unit 30 such that oxygen corresponding to the drain current value I2 is supplied over each of the second periods T2. Thus, fuel gas in the fuel cell 20 is consumed by power generation. As a result, as shown in the graph A of FIG. 5, the pressure value P decreases to the normal pressure value P1 in each of the second periods T2. Even when the pressure value P in the fuel cell 20 has increased through the first process, the fuel cell system 100 of the present embodiment is able to supply hydrogen gas to the fuel cell 20 again.

The process that the controller 40 of the present embodiment executes will be described with reference to FIG. 6. The process of step S26 in FIG. 6 differs from the process of step S16 in FIG. 5, and FIG. 6 is similar to FIG. 5 in the other points. When the pressure value P has reached the threshold pressure value P2 (YES in S12), the controller 40 sends the normal pressure value P1 to the fuel gas supply unit 10 as the pressure command value Pd in step S14 to start the second process and then proceeds with the process to step S26. In step S26, the controller 40 increases the generated current value I of the fuel cell from the normal current value I1 to the drain current value I2. Thus, the pressure value P in the fuel cell 20 decreases as shown in the graph A of FIG. 5.

In this way, when the pressure value P has reached the threshold pressure value P2, the controller 40 of the present embodiment reduces the pressure value P by increasing the generated current value I of the fuel cell 20 from the normal current value I1 to the drain current value I2. The increased amount of generated electric power is charged into the battery (not shown) of the battery electric vehicle. Therefore, it is possible to drain residual water W without waste of hydrogen gas.

Specific examples of the technology disclosed in the specification have been described in detail; however, these are only illustrative and are not intended to limit the scope of the appended claims. The technology described in the appended claims also encompasses various modifications and changes from the specific examples illustrated above. Modifications of the above-described embodiments will be described below.

First Modification

The controller 40 of the first embodiment executes the drain process during power generation of the fuel cell 20. The controller 40 of this modification may execute the drain process while the fuel cell 20 stops power generation. In this case, for example, in the process of step S16 of FIG. 4, the injector 6 may be closed.

Second Modification

The controller 40 may supply hydrogen gas to the fuel cell 20 in the first process by changing the output power of only the pump 18 without changing the output power of the injector 6. In further another modification, the controller 40 may supply hydrogen gas to the fuel cell 20 in the first process by changing only the output power of the injector 6 without changing the output power of the pump 18.

Third Modification

The controller 40 of the first embodiment may calculate the removed water amount W2 in accordance with a detected value of the intermediate pressure sensor 4 and a time during which the injector 6 is open in the process of step S6.

Fourth Modification

The controller 40 of the first embodiment, in the process of step S18, may estimate an exhaust amount accumulated value from the rate of decrease in the detected value of the low pressure sensor 12 and, when the exhaust amount accumulated value exceeds a predetermined threshold, start the first process again instead of comparing the pressure value P with the normal pressure value P1.

Fifth Modification

The controller 40 of the second embodiment, in the process of step S18, may start the first process again when the generated current value exceeds a predetermined threshold generated current value instead of comparing the pressure value P with the normal pressure value P1.

Sixth Modification

The fuel cell 20 does not need to include the bypass tube 29.

Seventh Modification

The controller 40 of the first embodiment, in the process of step S4, may change the output power of the injector 6 in accordance with the angle A1 at which the fuel cell 20 is inclined. In other words, the controller 40 of the present modification does not need to change the supply amount of hydrogen gas in accordance with the angle A1 at which the fuel cell 20 is inclined.

Eighth Modification

The controller 40 does not need to start the drain process in accordance with the operation track record of the fuel cell 20 in the process of step S2. The controller 40 may start the drain process at intervals of a predetermined period or may execute the drain process in accordance with a command from a user.

The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A fuel cell system comprising:
a fuel cell including a plurality of cells that are stacked;
a fuel gas supply unit configured to supply fuel gas to a supply port of the fuel cell; and
a controller configured to control an operation of the fuel gas supply unit, wherein:
the fuel gas supply unit includes a return path configured to return the fuel gas, exhausted through an exhaust port of the fuel cell, to the supply port, and a gas-liquid separator provided in the return path;
the controller is further configured to execute a drain process for draining residual water accumulated in the fuel cell through the exhaust port;
in the drain process,
a first process in which the fuel gas is supplied to the fuel cell until a pressure in the fuel cell reaches a predetermined threshold pressure, and
a second process in which the pressure in the fuel cell is reduced after the first process
are repeatedly executed; and
the controller is further configured to, in the second process, reduce the pressure in the fuel cell by increasing an amount of electric power generated by the fuel cell as compared to an amount of electric power generated in the first process.

2. The fuel cell system according to claim 1, wherein:
the fuel gas supply unit includes an exhaust valve connected to the gas-liquid separator.

3. The fuel cell system according to claim 1, wherein the fuel cell further includes
a manifold communicating the exhaust port with the plurality of cells, and
a bypass tube extending from the manifold to the exhaust port.

4. The fuel cell system according to claim 1, wherein the controller is configured to, in the first process, change a flow rate of the fuel gas supplied to the fuel cell in accordance with an inclination of the fuel cell with respect to a horizontal direction.

5. The fuel cell system according to claim 1, wherein the controller is configured to execute the drain process when an operation track record of the fuel cell exceeds a predetermined threshold track record.

* * * * *